United States Patent
Tanabe et al.

(10) Patent No.: US 9,965,976 B2
(45) Date of Patent: May 8, 2018

(54) MULTI-CELLULAR PHANTOM, PHANTOM CONTROL SYSTEM, AND PHANTOM CONTROL METHOD

(71) Applicant: Accuthera Inc., Kawasaki, Kanagawa (JP)

(72) Inventors: Eiji Tanabe, Kawasaki (JP); Koichiro Sugahara, Kawasaki (JP)

(73) Assignee: ACCUTHERA INC., Kawasaki (JP)

( * ) Notice: Subject to any disclaimer, the term of this patent is extended or adjusted under 35 U.S.C. 154(b) by 300 days.

(21) Appl. No.: 14/847,010

(22) Filed: Sep. 8, 2015

(65) Prior Publication Data

US 2016/0155365 A1    Jun. 2, 2016

(30) Foreign Application Priority Data

Nov. 27, 2014 (JP) ................. 2014-239408

(51) Int. Cl.
| | | |
|---|---|---|
| *G09B 23/30* | (2006.01) | |
| *G09B 23/32* | (2006.01) | |
| *G09B 23/28* | (2006.01) | |

(52) U.S. Cl.
CPC .......... *G09B 23/32* (2013.01); *G09B 23/288* (2013.01); *G09B 23/30* (2013.01); *G09B 23/303* (2013.01)

(58) Field of Classification Search
CPC .... G09B 23/32; G09B 23/288; G09B 23/303; G09B 23/306; G09B 23/12
USPC ...................................................... 434/272
See application file for complete search history.

(56) References Cited

U.S. PATENT DOCUMENTS

| | | | |
|---|---|---|---|
| 6,629,469 B2 | 10/2003 | Jaszczak et al. | |
| 6,843,145 B2 | 1/2005 | Jaszczak et al. | |
| 7,728,285 B2 | 6/2010 | Suh et al. | |
| 8,535,061 B2* | 9/2013 | Boutchko | A61B 5/416 434/262 |
| 8,884,243 B2 | 11/2014 | Schubert et al. | |
| 9,398,889 B2 | 7/2016 | Kirby et al. | |
| 2008/0298540 A1* | 12/2008 | Serban | A61B 6/583 378/18 |

FOREIGN PATENT DOCUMENTS

| | | |
|---|---|---|
| JP | H03-75170 B2 | 11/1991 |
| JP | H07-80089 A | 3/1995 |
| JP | 2005-185328 A1 | 7/2005 |
| JP | 2009-522055 A1 | 6/2009 |
| JP | 5501058 B2 | 5/2014 |
| WO | 2010-016353 A1 | 2/2010 |

* cited by examiner

*Primary Examiner* — Sam Yao
*Assistant Examiner* — Lily M Del Valle
(74) *Attorney, Agent, or Firm* — Isshiki International Law Office; Joseph P. Farrar, Esq.

(57) ABSTRACT

A phantom for simulating motions of both the body surface and the internal organs simultaneously, having a structure comprising of a body cell 12 and an internal organ part cell 2. The body cell 12 simulates a body. The internal organ part cell 2 is installed inside a body cell 12 and contains internal organ cells 11a and 11b which simulate internal organs like lung and others. Each of the body cell 12, the internal organ part cell 2 and the internal organ cells 11a and 11b has elastic surface and is able to expand like a balloon. Each cell is provided with a protrusion 170 for connecting a tube 40 to pass fluid.

10 Claims, 8 Drawing Sheets

(CT APPARATUS)

(X-RAY RADIATION THERAPY APPARATUS)

(PREPARATION PROCESS)

(a)

(PRIOR INSPECTION USING MULTI CELLULAR PHANTOM)

(b)

(INTERNAL CELL AND TARGET CELL)

(a)

FRONT (b)

REAR (c)

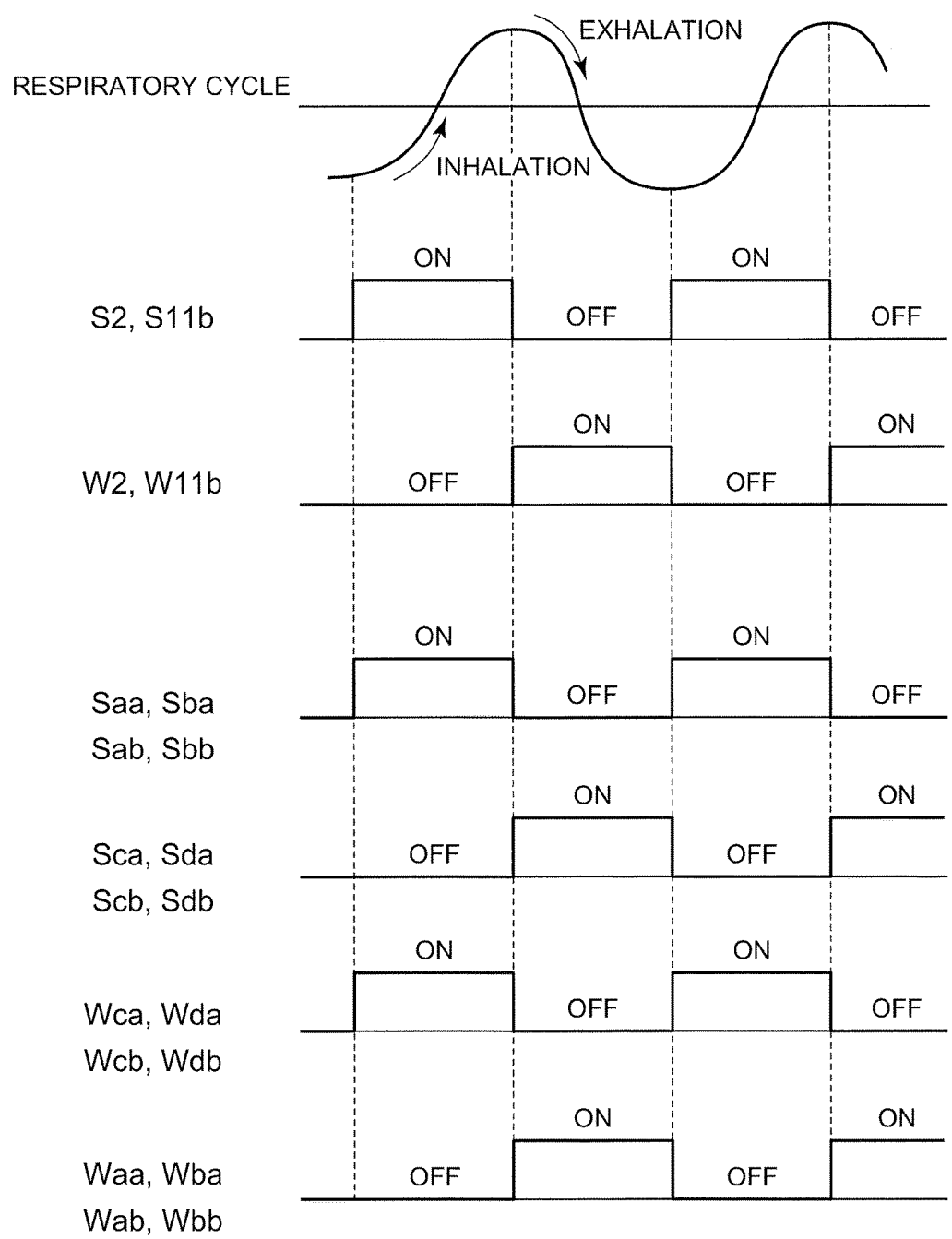

MULTI-CELLULAR PHANTOM, PHANTOM CONTROL SYSTEM, AND PHANTOM CONTROL METHOD

CROSS-REFERENCE TO RELATED APPLICATION

The present application claims priority pursuant to 35 U.S.C. § 119(a) from Japanese patent application number 2014-239408, filed on Nov. 27, 2014, the entire disclosure of which is incorporated by reference herein.

BACKGROUND

Technical Field

Aspects of the example implementations relate to a phantom for radiation oncology used in X-ray radiation therapy, and a phantom control system and control method.

Related Art

In radiation (X-ray) therapy, in which a patient is irradiated with X-rays, the X-rays are first generated by an X-ray generator and are then focused onto an affected area of the patient by a collimator (an apparatus with a focusing function), while being shaped to conform to the shape of the affected area. In this process, it is necessary to correctly irradiate only the abnormal cells (tumor cells, for example), while keeping irradiation of neighboring normal cells to a minimum.

However, the shapes of tumors observed in the human body vary considerably. Also, since the patient subject to X-ray radiation is a living organism, the body moves slightly even when the patient is lying on a couch and at rest. The body motion is caused by motions of the internal organs, for example, by the lungs and the heart, and the body moves four-dimensionally (4D) in various patterns. Here, 4D motion means motion in three-dimensional coordinate space and in time.

For example, in the case of radiation therapy of a lung tumor, the lung tumor moves with the lungs during respiration. To dynamically capture movement of the tumor by 4D-CT (Four-Dimensional Computer Tomography), and to correctly radiate an X-ray beam to the tumor itself, a marker is set close to the tumor. The motion of the marker is captured by the X-ray perspective image, and then an X-ray is radiated.

As already described, it is necessary first to study the 4D motion of a patient, and then to check if the motion is properly tracked and if the X-ray is radiated at the proper point. Since the check is carried out during X-ray radiation, a human being cannot be used as the target.

Accordingly, a phantom that simulates a human being to a greater or lesser degree of accuracy is used. In some case, however, because the phantom does not show any motion, the body motion previously described is not taken into account when estimating the X-ray dosage. In those cases where the phantom does model body motions, the modeling is unidirectional and/or incapable of expressing internal motions.

Also, in previous phantoms, it has been difficult to reproduce electron density (gray scales of CT image) of human body. Accordingly, in a prior inspection of the treatment of the treatment plan using the previous phantoms, reproducibility of absorbed dose at a tumor location is unsatisfactory.

SUMMARY

The present invention provides an improved phantom for radiation oncology that can simulate motions of both the surface of the human body and the internal organs simultaneously.

More specifically, the present invention provides a phantom that enables simulation of motion of both the surface of the human body and the internal organs simultaneously, and is comprised of a body cell and one or more internal organ part cells installed therein.

The body cell simulates a human body and is implemented by a single chamber (a cell). The internal organ part cell contains internal organs and which simulate human internal organs. Each of the internal organ part cell and the internal organ cells is provided with a mounting part to connect a tubular member for passing through fluid. Each of the body cell, the internal organ part cell and the internal organ cells are composed of a material which has elasticity at the surface and is able to expand and contract. When the fluid flows into the cell the expansion occurs, whereas when the fluid flows out from the cell the contraction occurs. The surface of the body cell moves synchronously with the expansion-contraction motion of the expansion and contraction of the internal organ part cells and the internal organ cells in a manner to propagate the expansion-contraction motion further.

Here, the term "body" means a torso, without head, neck, arms and legs, and includes the chest and abdomen. The "fluid", of course, includes a gas, a liquid, and their mixtures. A typical example of gas is air. A typical example of liquid is water. However, these examples are not restrictive.

The multi-cellular phantom of the present invention is composed of a body cell which simulates a human body, and internal organ part cells which simulate human internal organs and are installed inside a body cell. Each of them has a cellular structure (called "Elastic Balloon") composed of a chamber (or a cell) with an elastic surface and is able to expand and contract. Furthermore, a mounting part is provided in each cell structure for connecting a tubular member through which fluid like gas (air) flows. When gas flows in to the cell it expands, while when gas flows out from the cell it contracts. In the present multi-cellular phantom the surface of the body cell moves in synchronization with the expansion and contraction of the internal organ part cell and the internal organ cells installed inside the internal organ part cells in a manner to propagate the expansion and contraction motion. Therefore, by controlling pumping of compressed air through a tubular member each cell repeats expansion and contraction, and both the motions of the surface of the human body (the surface of the body cell) and of the human internal organs (internal organ part cells and the internal organ cells) are possible to be simulated simultaneously.

Use of a material that transmits electromagnetic waves for the material that has a surface elasticity and is able to expand and contract enables reliable reproduction of human (i.e., a patient's) motion in obtaining, for example, the X-ray 4D-CT image, and the phantom can be used in X-ray therapy. Here, the term "electromagnetic waves" is used in a broad sense, including radio waves and X-rays (radiation).

Additionally, the present invention may be configured with a target cell and multiple internal cells sandwiched by several internal organ cells. The internal cells are installed around the target cell. The target cell simulates a malignant tumor and a detector is built in its inside to detect radiation. The internal cell is constructed with a material which transmits radiation and is provided with a mounting part for connecting tubular member to pass fluid. By pumping in the fluid into the internal cell the expansion occurs, while by pumping out the fluid from the internal cell the contraction occurs. In response to the expansion and contraction the target cell is able to move in an arbitrary direction.

With this configuration, the target cell, which simulates a malignant tumor, is able to move in an arbitrary direction in three dimensions by the expansion and contraction motion of the internal cells surrounding the target cell, and the detector built in the target cell detects radiation. Therefore, since motion of the malignant tumor is precisely reproduced by moving the target cell, it is possible to prepare an X-ray treatment plan of the malignant tumor by detecting an X-ray by the detector.

Furthermore, with a configuration with one or more markers installed close to the target cell, these markers can be used to trace the body motion during the X-ray therapy. And by installing registration media (film, for example) reactive to X-ray in the target cell, the dose calculation under the X-ray radiation becomes possible. When a phantom has a configuration such that the mounting part consists of a hollow protrusion to fit a tube as a tubular member, or a configuration such that a cell and a tube as a tubular member are integrally molded, it is advantageous because the tube is easily attached.

Other aspects of the present invention are a control system and a control method for controlling a multi-cellular radiology phantom. The control system is implemented by a compressor for supplying compressed fluid, tubular members for connecting the compressor to respective cells, multiple of valves which are installed at an intermediate portion of each of the tubular members and are controllable to be open or close, and a controller controlling operation of the system itself. The controller is equipped with a switch for controlling opening and closing of each of the valves. The control method comprises supplying compressed fluid from a compressor through a group of bidirectional tubular members that pass fluid in two directions to each cell of the multi-cellular phantom through the mounting part of each cell; and opening and closing the tubular members via multiple valves each provided at an intermediate portion of a respective one of the tubular members to control the supply of compressed fluid from the compressor to the each cell using a controller.

BRIEF DESCRIPTION OF THE DRAWINGS

A more complete appreciation of the present disclosure and many of the attendant advantages thereof may be obtained as the same becomes better understood by reference to the following detailed description when considered in connection with the accompanying drawings, wherein

FIG. 9 is a timing chart illustrating the switch control signal for controlling opening and closing of valves.

DETAILED DESCRIPTION

An embodiment of the present invention will be described below with reference to the drawings.

It is to be noted that although certain specific terminology is employed for the sake of clarity, the present disclosure is not limited to the specific terminology so selected and it is to be understood that each specific element includes all technical equivalents that have a similar function, operation in a similar manner, and achieve a similar result.

Figure 1:
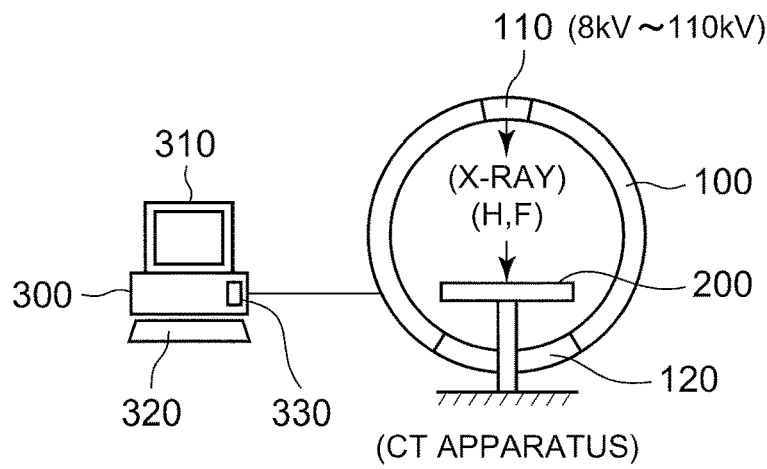
FIG. 1 is a block diagram illustrating a 4D-CT apparatus.
Figure 2:
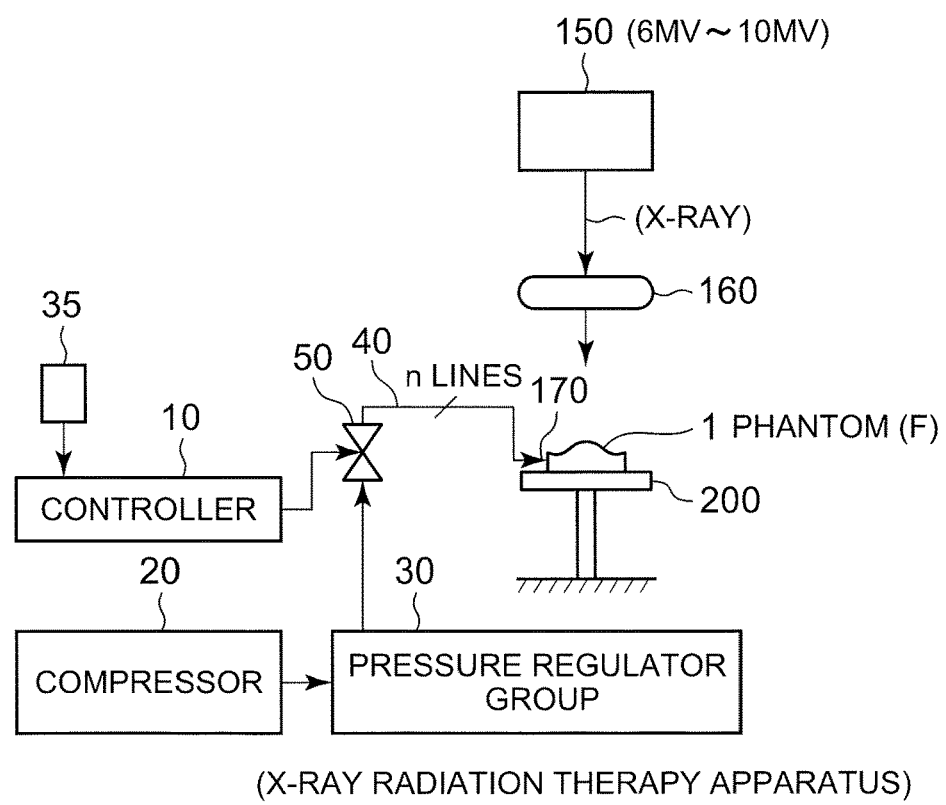
FIG. 2 is a block diagram illustrating an X-ray therapy apparatus.

FIG. 1 is a block diagram illustrating the 4D-CT apparatus for capturing 4D-CT images, and FIG. 2 is a block diagram illustrating X-ray therapeutic apparatus for carrying out X-ray tracking radiation. FIGS. 3(a), 3(b) and 3(c) are respectively diagrams schematically illustrating a body cell 12, internal organ part cells (a chest cell 2 and an abdomen cell 6), and internal organ cells 11a and 11b;

4D-CT Apparatus

A 4D-CT (Four-Dimensional Computed Tomography) apparatus is an apparatus for capturing images of internal body cross sections by using X-rays. The 4D-CT apparatus is provided with an annular gantry 100. In the gantry 100 an X-ray generator 110 and an arc-shaped detector 120 are installed. The X-ray generator 110 emits X-rays at 8 kV to 110 kV, and the arc-shaped detector 120 is installed opposite the X-ray generator 110 so as to receive transmitted X-ray. The X-ray generator 110 and the detector 120 maintain the same relative positions, and rotate together in the gantry cover, for example, twice per second. Also, the couch 200 is installed as a bed, and by the rotational motion of the X-ray generator 110 and detector 120 it is possible to capture 4D-CT images of a patient H lying on the couch 200 or a phantom F set on the couch 200.

Furthermore, it is configured such that many 4D-CT images captured are sent to an information processing apparatus 300. The information processing apparatus 300 is equipped with a monitor 310 as a display apparatus and a keyboard 320 as an input apparatus. An SD card can be inserted in an SD card slot 330 in one side of the information processing apparatus 300. When the operator inserts the SD card into the SD card slot 330, and further carries out input operation on the operation screen on the monitor 310 by operating the input apparatus 320, the information processing apparatus 300 carries out a desired operation, such as recording the necessary information on the SD card. With such an arrangement, as will be explained later, the physician can easily analyze body motion associated with human respiration by looking at the screen on the monitor 310 and then produce an appropriate treatment plan.

X-Ray Treatment Apparatus

The X-ray treatment apparatus is comprised of an X-ray generator 150 which emits X-ray of 6 MV to 10 MV, and an X-ray collimator 160 which focuses the radiation field to fit the shape of an affected area. Thus, a phantom (F) 1 is placed on the couch 200. The phantom 1 is specific to the present invention. The phantom 1 is comprised of a body cell 12 which simulates a human body (see in FIG. 3) and one or more internal organ part cells 2 installed therein. The internal organ part cell 2 contains internal organ cells which simulate human internal organs (see, for example, 11a and 11b in FIG. 3, modeling the lungs). Each of the body cell 12, the internal organ part cell 2, and the internal organ cells 11a and 11b has elastic surfaces, and is constructed as a single chamber (or a cell) which is able to expand like a balloon or to contract. Each of them is provided with a mounting part (170 in FIG. 6) for connecting a tubular member or a tube 40 to pass fluid, for example, air in two directions (in the following explanation air is used as fluid). By pumping air into the cell, the above-described expansion occurs.

Figure 4:
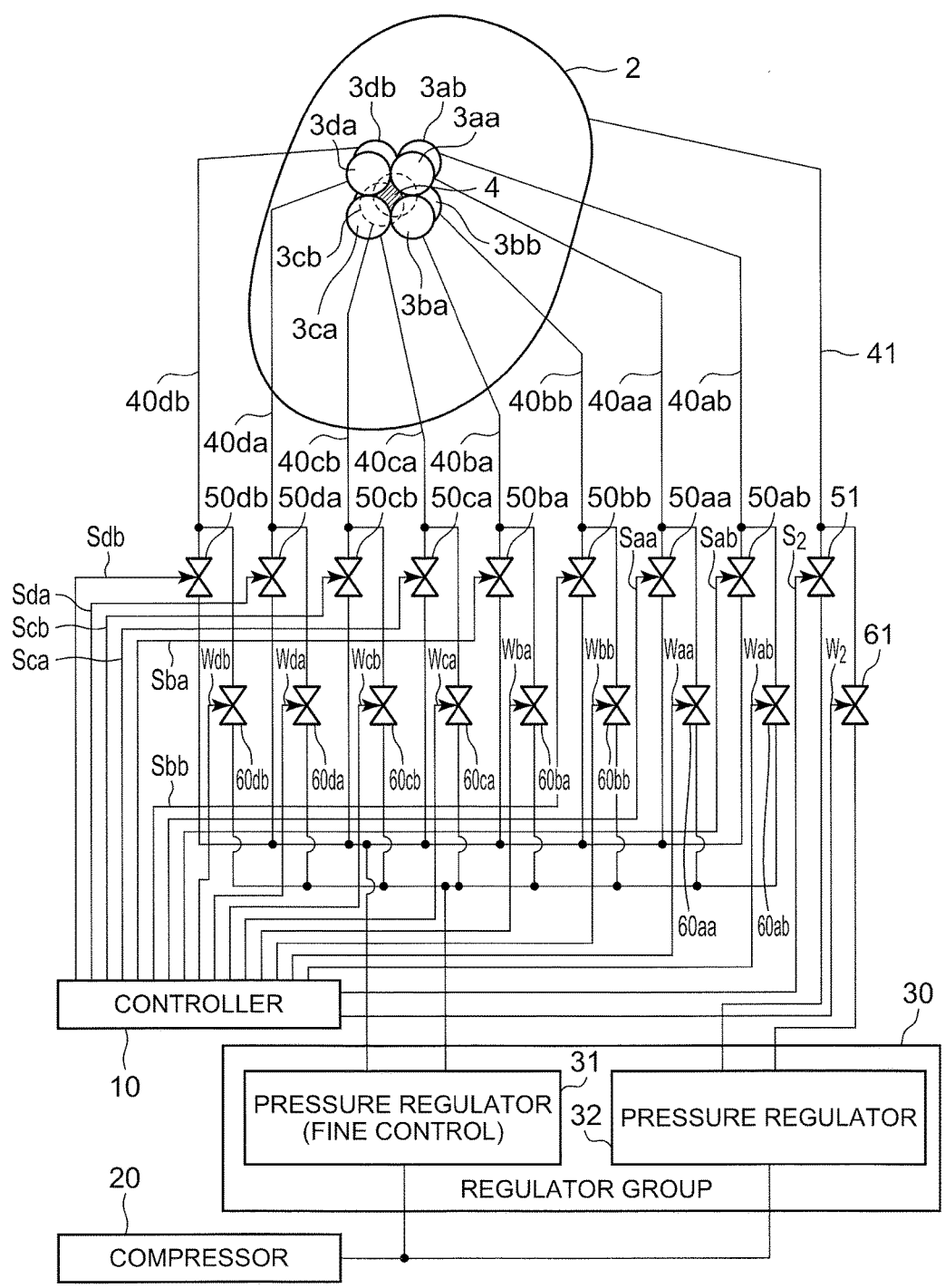
FIG. 4 is a block diagram illustrating a control system.

FIG. 4 is a block diagram illustrating a control system.

To the multiple of these mounting parts 170, n hollow circular tubes are connected, where n is the total number of cells and is normally 8 or more. The other end of each of the tube opposite the cell is connected a pressure regulator group 30 composed of a regulator 31 and 32 which regulates pressure of compressed air supplied from a compressor 20. Valves 50 and 60 are installed at an intermediate portion of each tube 40. These valves 50 (50*aa*, 50*ba*, 50*ca*, 50*da*, 50*ab*, 50*bb*, 50*cb*, 50*db*) and 60 (60*aa*, 60*ba*, 60*ca*, 60*da*, 60*ab*, 60*bb*, 60*cb*, 60*db*) are able to be controlled in open and close state, and the pressure of compressed air supplied from the air compressor 20 is regulated by a pressure regulator group 30. Still, it is preferable to provide a pressure sensor in the pressure regulator group 30 so as to enable real-time feed-back control of the regulation pressure according to the pressure detected by the pressure sensor, since the pressure regulation is carried out more accurately.

By inserting the SD card with the record of data taken beforehand by the CT apparatus to the controller 10, opening and closing of respective valves 50 and 60 can be controlled with a predetermined timing based on the data. Therewith, each cell repeatedly carries out expansion motion and contraction motion. Thus, it becomes possible to simulate motions of both the surface of the human body and the internal organs simultaneously. The X-ray apparatus carries out an X-ray irradiation to the phantom 1 which is reproducing motions of both the surface of the human body and the internal organs, and inspection of the patient's X-ray treatment is carried out. In the case that both the 4D-CT apparatus and the X-ray treatment apparatus are operated in a treatment room, it is necessary to match the X-ray emitting position of the 4D-CT apparatus to that of the X-ray treatment apparatus in a three-dimensional coordinate system (X, Y, Z). For that purpose, a robot for apparatus transport, for example, may be used for interchanging and aligning the two apparatuses.

Structure of the Phantom

Next, the multi-cellular phantom will be described with reference to FIG. 3 and FIG. 6. The multi-cellular phantom is configured with a body cell 12 which simulates a human body, and one or more internal cells installed therein.

The internal cell contains internal organ cells 11*a* and 11*b* which simulate human internal organs. Each of the body cell 12, the internal organ part cell 2, and the internal organ cells 11*a* and 11*b* has a structure of a single chamber (a cell) which has elasticity on its surface, and is able to expand like a balloon as well as to contract. Each cell is provided with a protrusion 170 for connecting a tube to pass through air, and each cell is configured to expand by pumping air into. The material used for each cell has an electron density (or a gray scale of 4D-CT image) as close as possible to that of the human body. Also, to make the electron density as close as possible to the human one, appropriate infills are packed in a cell or in a space between cells. Since the phantom is expected to be irradiated by an X-ray (or radiation) or a type of electromagnetic wave, the phantom is formed of a material strongly resistant to radiation. Preferred materials are silicone rubber and polyimide.

Figure 3:
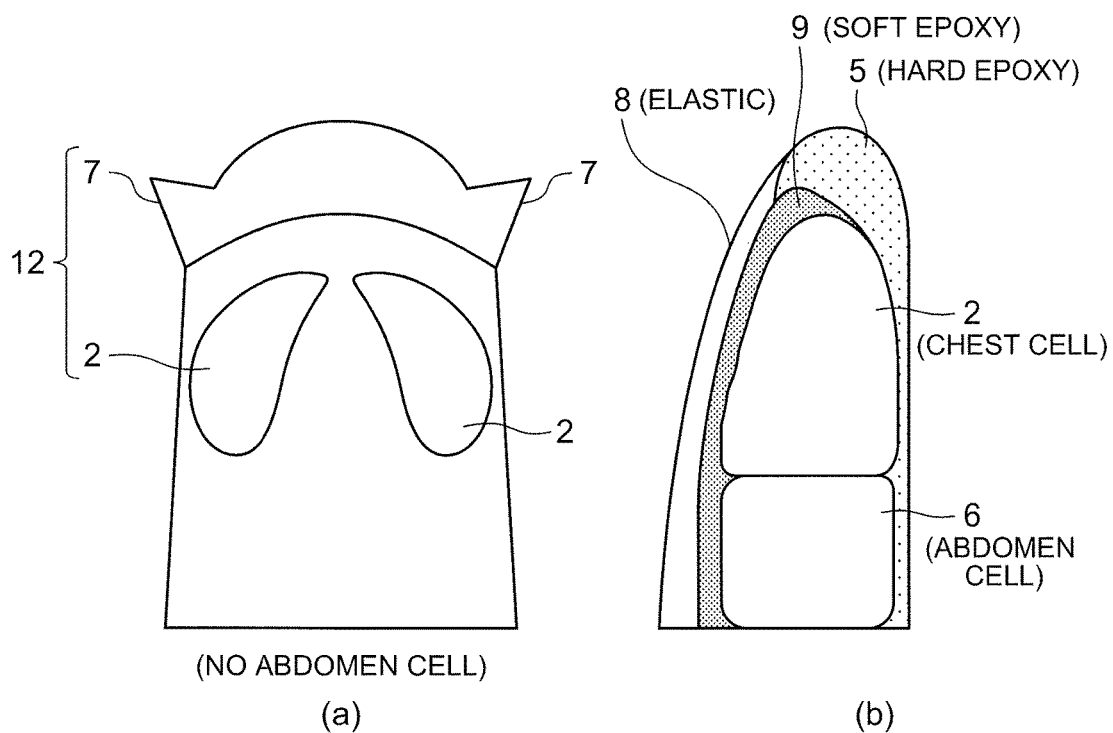
FIG. 3 is a diagram schematically illustrating a body cell 12, internal organ part cells (a chest cell 2, an abdomen cell 6), and internal organ cells 11a and 11b.
Figure 3:
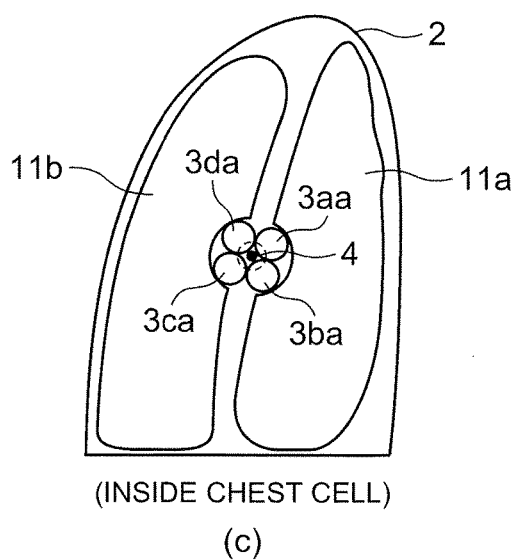

Here, the body indicates the torso without head, neck, arms and legs, but with chest and abdomen, and thus, as illustrated in FIG. 3(*a*), the phantom has no neck, no arms, and no lower body. Therefore, as illustrated in FIG. 3(*a*), an example of the phantom forms left and right shoulders, 7 and 7, without both arms, and has no head. In FIG. 3(*a*) the organ part cell of the abdominal cell 6 is omitted, whereas in FIG. 3(*b*) internal organ cells 11*a* and 11*b* are omitted. Also, in the present embodiment, other internal organ cells like a heart, a lever liver etc. are not installed intentionally for simplicity reasons, but an actual embodiment is configured with many cells simulating various different internal organs being installed in the body cell 12.

FIG. 3(*b*) is a view schematically illustrating a lateral cross section of the body cell 12. The schematic view differs from the exact cross sectional view, and serves to facilitate understanding. As illustrated in FIG. 3(*b*), a dorsal surface part 5 which lies at the rear of the body cell 12 is comprised of layers of hard epoxy, for example. Thereon, an internal organ part cell 2 which simulates a chest part and an internal organ part cell 6 which simulates an abdominal part are installed. Above these internal organ part cells 2 and 6 layers of soft epoxy 9 are formed. And at the outmost position, a body surface 8 made of silicone rubber with elasticity is installed. By using soft epoxy 9 and elastic material for the body surface 8, it is possible for internal organ part cells 2 and 6 to repeat expansion motion in the upper direction and contraction motion in the lower direction. Thus, not only internal organ part cells and the body cell but also the body surface moves in the upper and lower directions (left and right in FIG. 3) simultaneously, and it is possible to reproduce the human body motion with extreme reality.

FIG. 3(*c*) represents a view schematically illustrating the structure of the internal organ cells 11*a* and 11*b*, internal cells 3 and a target cell 4 in the internal organ part cell 2. In the example, two internal organ cells 11*a* and 11*b* are installed in the internal organ part cell 2. Each of internal organ cells 11*a* and 11*b* simulates a lung. Each of them has an elastic surface, and has a cell structure expandable like a balloon. Each of them is provided with a protrusion 170 for connecting a tube to pass through air, and expands by pumping air into. Note that internal organ cells 11*a* and 11*b* get access to tube 40 through small holes provided in the internal organ part cell 2.

In the example, a target cell 4 and the surrounding eight internal cells 3*aa*, 3*ba*, 3*ca*, 3*da*, 3*ab*, 3*bb*, 3*cb*, 3*db*, in total nine cells, are installed to sandwich a pair of internal organ cells 11*a* and 11*b* (though only four cells, 3*aa*, 3*ba*, 3*ca*, and 3*da*, are illustrated in FIG. 3(*c*)). The target cell 4 is a cell to simulate a malignant tumor, and is configured to build in a detector (a capsule) to detect radiation or a film. The detector can be made of a semiconductor sensor as a flat panel sensor or photo diode. The shape of a capsule can be spherical or cylindrical, but it is not restrictive, and it is better to simulate the shape of the tumor as close as possible. Each of the target cell 4 and the surrounding internal cells 3*aa*, 3*ba*, 3*ca*, 3*da*, 3*ab*, 3*bb*, 3*cb*, 3*db* has a cell structure with an elastic surface and is able to expand like a balloon. Each cell is provided with a protrusion 170 for connecting a tube to pass through air, and expands by pumping air into. The internal organ part cell 2 is an exterior structure for providing a storage space to store internal organ cells 11*a* and 11*b*.

In this manner, the internal organ part cell 2 which simulates chest part is installed in the body cell 12, and furthermore the internal organ cells 11*a* and 11*b* which simulate a lung or other internal organs are installed therein. Thus, the present phantom has a multi-cellular structure (with multiple cells), such that one or more internal cells are installed in the body cell, and in each of the internal organ part cells are installed multiple internal organ cells, multiple internal cells sandwiched by the internal organ cells, and a target cell surrounded by these internal cells. Thus, the phantom which embodies the present invention is referred to as a "multi cellular phantom". The example illustrated in FIG. 3 is simplified as much as possible for descriptive purposes. In an actual case by installing cells with lung or alveoli shapes in the internal organ cells 11*a* and 11*b* the electronic density will be improved and it will be able to reproduce human movement more realistically. Furthermore, it is possible to fill the so-called sponges in empty spaces under compression.

FIGS. 6*a*, 6*b*, and 6*c* are respectively structural diagrams schematically illustrating the mounting part for connecting a tube 40 to the cell.

Figure 6:
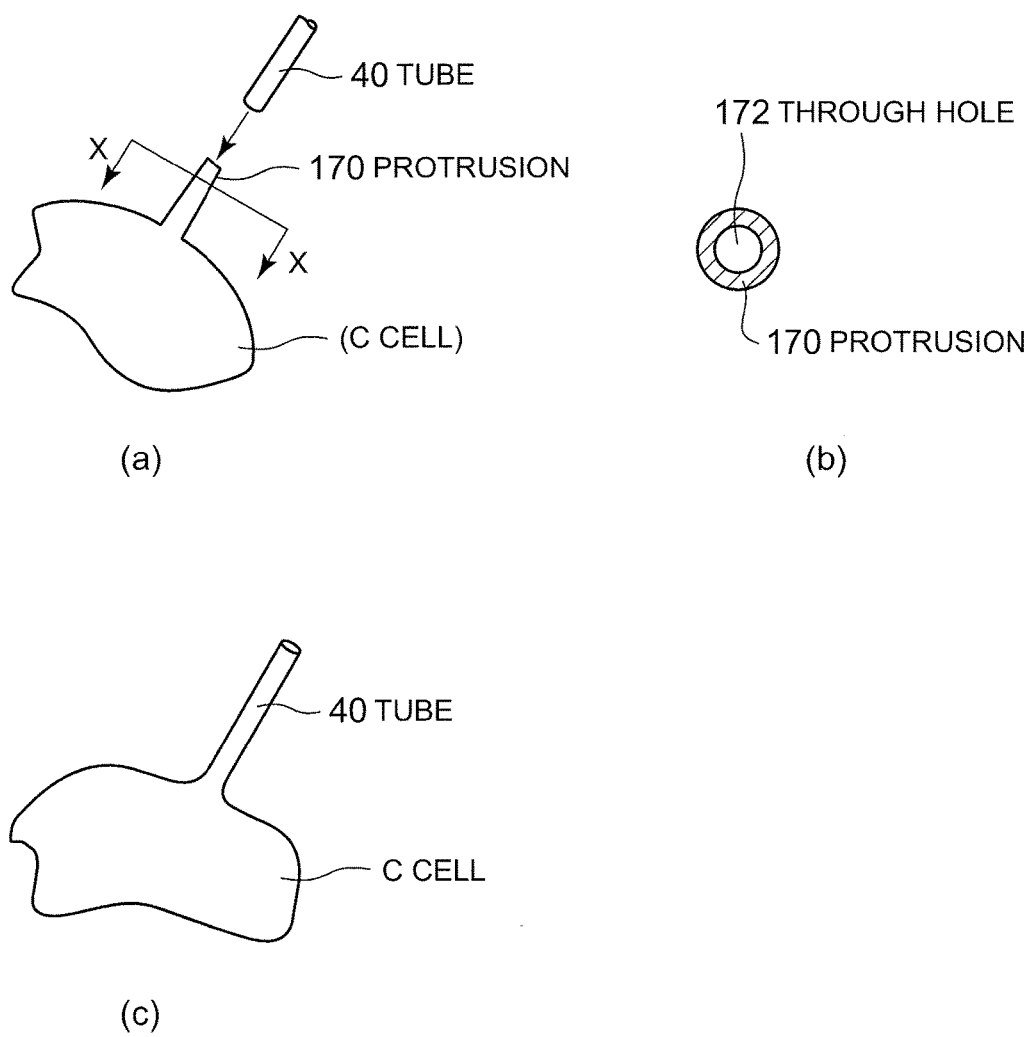
FIG. 6 is a structural diagram schematically illustrating the mounting part for connecting a tube 40 to the cell.

As illustrated in FIG. 6(*a*) a protrusion 170 is projecting out from the cell C surface. FIG. 6(*b*) is an enlarged view of the protrusion in FIG. 6(*a*) at a cross section on a line X-X. The protrusion 170 has annular shape in its cross section, and the protruding part has hollow tubular shape. Namely, the cross section of the protrusion 170 normal to its protruding direction runs through a circular through-hole 172. The outer end of the protrusion 170 in the protruding direction is imbedded in a tube 40, and its inner end is communicating with the inside of the cell. The tube 40 is elastic as a whole, and is made of hollow material with extra-fine diameter, and the inner diameter of the tube is set slightly smaller than the outer diameter of the protrusion 170. Therefore, it is possible to fit the tube 40 to the protrusion 170, or to remove fit tube 40 from the protrusion 170.

Also, FIG. 6(*c*) illustrates an example configuration that the cell C and the tube 40 are integrally molded. By integrally molding the cell C and the tube 40 air leak from the mounting part or dislodgment of the tube are avoided, and it is advantageous to improve reliability. Thus, a mounting part where the tube 40 is easily fit or removed is achieved.

Cell Movement Control System

Next, the control system for each cell movement is described by referring to FIG. 4, FIG. 7, FIG. 8 and FIG. 9. For simplicity, a description is given of each of the internal organ part cell 2 and the eight internal cells. As illustrated in FIG. 4, the object to be controlled is the internal organ part cell 2 and the eight internal cells, 3*aa*, 3*ba*, 3*ca*, 3*da*, 3*ab*, 3*bb*, 3*cb*, and 3*db* installed in the internal organ part cell 2.

Figure 7:
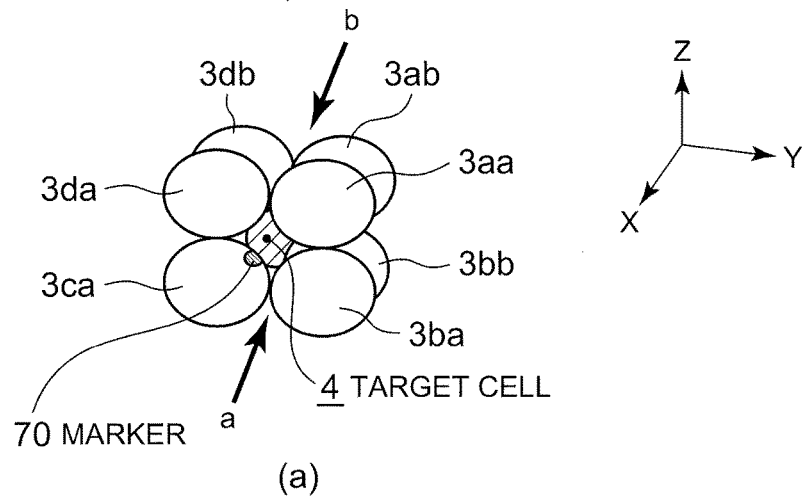
FIG. 7 is a structural diagram schematically illustrating the internal cell 3 and the target cell 4.
Figure 7:
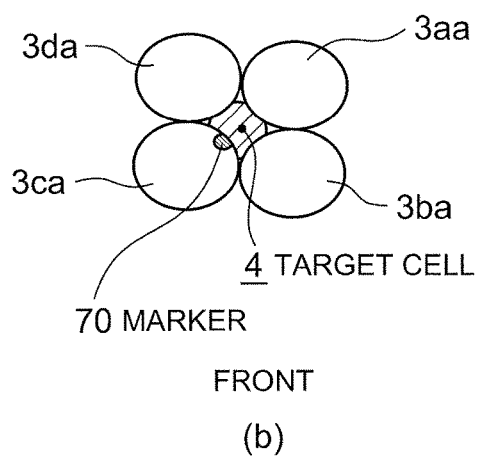
Figure 7:
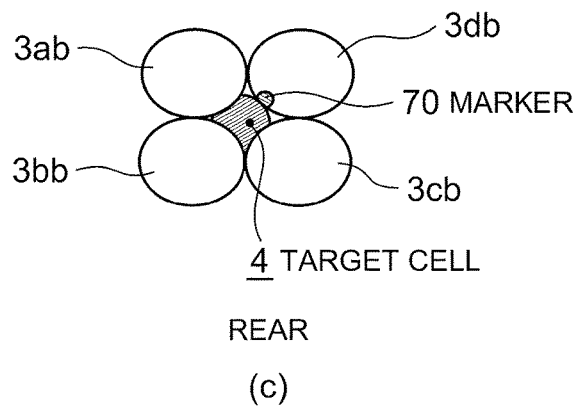

FIGS. 7*a*, 7*b*, and 7*c* are respectively structural diagrams schematically illustrating the internal cell 3 and the target cell 4. More specifically, FIG. 7(*b*) is a view of FIG. 7(*a*) observed from the direction a (from the front side of the paper), and FIG. 7(*c*) is a view from the direction b (from the rear side of the paper).

FIGS. 7*a*, 7*b*, and 7*c* illustrate an example configuration of the eight internal cells. They have a double-layer structure such that on top of the four internal cells (3*ba*, 3*ca*, 3*bb* and 3*cb*) aligned in a square in plan view, another four internal cells (3*aa*, 3*ab*, 3*db* and 3*da*) are overlaid. The eight internal cells are installed in a manner to surround a target cell 4 which simulates a malignant tumor and in which a detector for detecting radiation is built in. The target cell 4 and the many internal cells are sandwiched between the multiple internal organ cells (11*a* and 11*b* in FIG. 3). This configuration allows the target cell 4 installed in the eight internal cells to move in three-dimensional directions along X, Y and Z axes by expanding or contracting eight internal cells. Note that the number of internal cells can be increased or decreased as appropriate for this purpose.

In addition, by installing one or more markers 70, for example gold markers, on the internal cell, the state of the markers used in actual X-ray treatment can be simulated. The marker 70 can be installed not only on an internal cell but can be installed directly on the target cell. In FIG. 7, by pumping air into the internal cells 3*ab*, 3*bb*, 3*cb*, 3*db* and expanding them, the target cell 4 moves in the X direction. In this case, by pumping air out from the internal cells 3*aa*, 3*ba*, 3*ca* and 3*da*, more fine control over the shift of the target cell 4 is possible. Similarly, by expanding 3*bb*, 3*ba*, 3*ca* and 3*cb*, and contracting 3*ab*, 3*aa*, 3*da* and 3*db*, the target cell 4 can be shifted in Z direction. In this manner, by controlling expansion and contraction of every internal cell, the target cell can be eventually shifted in any arbitrary direction, in three dimensions.

In FIG. 4, the tube 40 and 41 are connected to each cell, and at an intermediate portion of each of the tubes, the valves 50*aa*, 50*ba*, 50*ca*, 50*da*, 50*ab*, 50*bb*, 50*cb*, 50*db* and 51, and the valves 60*aa*, 60*ba*, 60*ca*, 60*da*, 60*ab*, 60*bb*, 60*cb*, 60*db* and 61 are provided. The end of each of the tubes opposite the end connected to each of the cells is connected to pressure regulators 31 and 32. Here, the valve 50 is a valve for controlling inflow of air to each of the cells, and the valve 60 is a valve for controlling outflow of air from each of the cells.

As shown in FIG. 4, a control system of the present invention is configured with a compressor 20 for supplying compressed air, a group of regulators composed of several pressure regulators, and a controller 10. The controller 10 sends to each of the valves signals for controlling valve opening and closing, Saa, Sba, Sca, Sda, Sab, Sbb, Scb, Sdb, S2, Waa, Wba, Wca, Wda, Wab, Wbb, Wcb, Wdb, and W2, and controls opening and closing of each of the valves 50*aa* to 50*db*, 51, 60*aa* to 60*db*, and 61. As is illustrated in FIG. 1, by inserting SD card 35 to the controller 10, information recorded on the SD card is read, and the controller 10 operates.

Among a group of pressure regulators, several types of pressure regulators 31 and 32 exist. In the present example, a group of pressure regulators is composed of a pressure regulator 31 and a pressure regulator 32. The pressure regulator 31 has a higher precision for pressure regulation, is appropriate to finer control, and is used for the internal cells 3*aa* to 3*db* in the example, whereas the pressure regulator 32 controls the internal organ part cell 2. In this manner, it is possible to send compressed air of different pressure to cells with different amplitudes of movement, and thus more fine control over the cell movement is possible.

The controller 10, when the SD card 35 is inserted therein, controls the opening and closing of the valves 50*aa* to 50*db*, 51, 60*aa* to 60*db* and 61 according to a preset timing chart like that shown in FIG. 9 described below.

Figure 8:
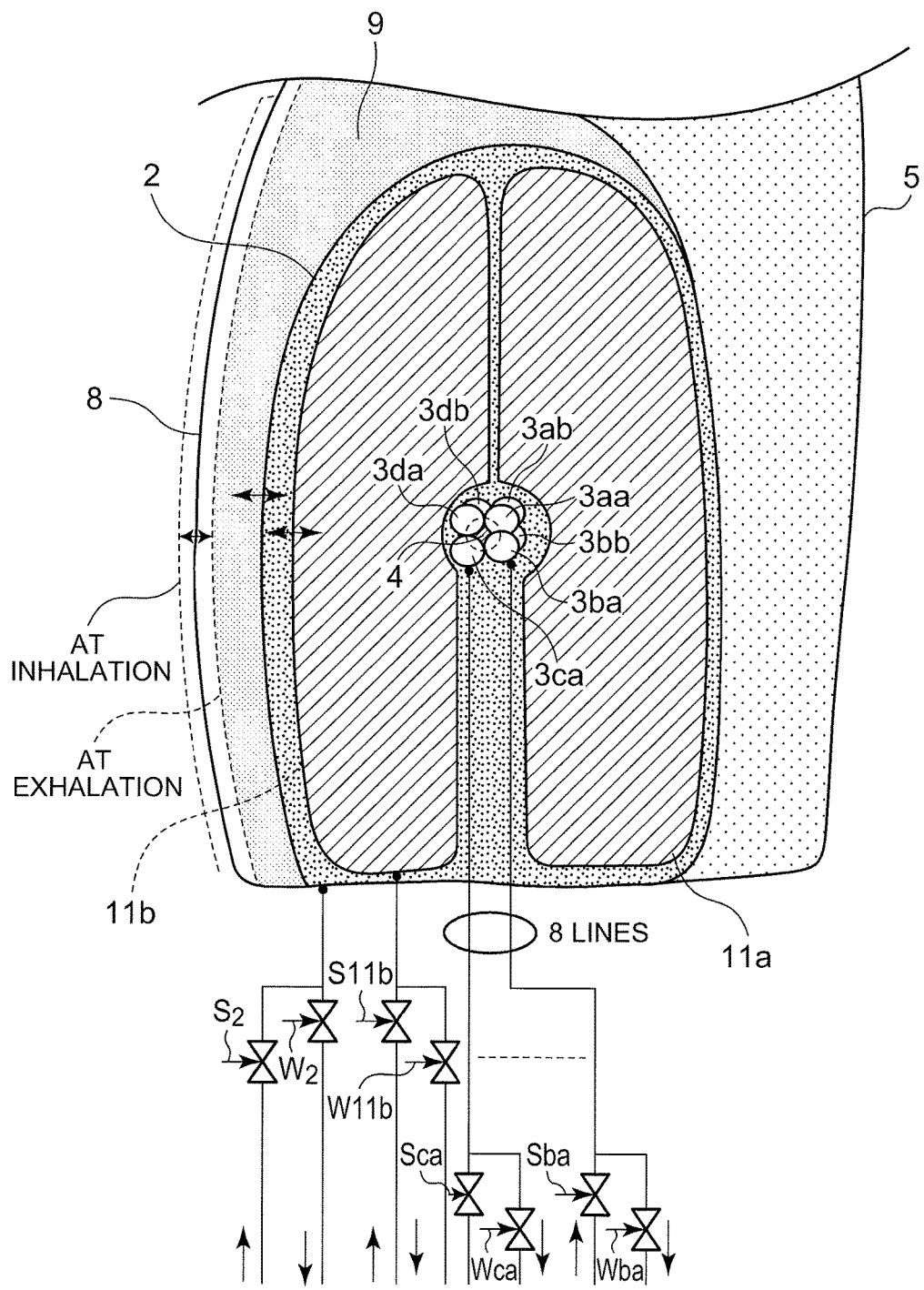
FIG. 8 is a diagram schematically illustrating motion of the present invention of the multi-cellular phantom.

FIG. 8 is a diagram schematically illustrating motion of the present invention of the multi-cellular phantom. FIG. 9 is a timing chart illustrating the switch control signal for controlling opening and closing of the valves 50*zz* and 60*zz*.

First, the inhalation phase when air comes into the lungs is described. In FIG. 8 it is controlled such that valves 51 and 11*b*1 are open and valves 61 and 11*b*2 are closed in such a manner that air flows in to the internal organ part cell 2 and the internal organ cell 11*b*. As a result, the internal organ part cell 2 and the internal cell 11*b* expand, and the body surface 8 spreads outwards to the body exterior.

Next, the exhalation phase when air goes out from the lungs is described. It is controlled such that valves 51 and 11*b*1 are closed and valves 61 and 11*b*2 are open in a manner that air flows out from the internal organ part cell 2 and the internal organ cell 11*b*. As a result, the internal organ part cell 2 and the internal organ cell 11*b* contract, and the body surface 8 shrinks inwards to the body interior. Thus, it is possible to simulate motions of internal organs and the body surface in response to human respiration cycle.

Note that the amplitude of the expansion and contraction (or, how large internal organs or body surface move) can be set in accordance to the patient specific respiration cycle. Also, by controlling opening and closing of valves 50aa to 50db and 60aa to 60db, the motion of the target cell 4 can simulate actual tumor motion. In FIG. 8 a left-right arrow indicates that the object indicated moves in that direction.

Here FIG. 9 is described specifically. As is clear by referring to FIGS. 4 and 8, "S2 and S11b" are signals controlling respective valves 50 of internal organ part cell 2 and internal organ cell 11b installed therein, "Saa, Sba, Sab and Sbb" are signals controlling respective valves 50 of internal cells 3aa, 3ba, 3ab and 3bb, and "Wca, Wda, Wcb and Wdb" are signals controlling respective valves 60 of internal cells 3ca, 3da, 3cb and 3db. Furthermore, "W2 and W11b" are signals controlling respective valves 60 of internal organ part cell 2 and internal organ cell 11b, "Sca, Sda, Scb and Sdb" are signals controlling respective valves 50 of internal cells 3ca, 3da, 3cb and 3db, and "Waa, Wba, Wab and Wdbb" are signals controlling respective valves 60 of internal cells 3aa, 3ba, 3ab and 3bb.

As is clear from FIG. 9, when "S2 and S11b" are ON (in state 1), "Saa, Sba, Sab, Sbb" are ON, and "Wca, Wda, Wcb, and Wdb" are also ON. That means respective valves 50 of the internal organ part cell 2 and the internal organ cell 11b are in open state, respective valves of the internal cells 3aa, 3ba, 3ab and 3bb are in open state, and respective valves 60 of the internal cells 3ca, 3da, 3cb, and 3db are in open state. Conversely, in the state 1, "W2 and W11b" are OFF, "Sca, Sda, Scb and Sdb" are also OFF, and "Waa, Wba, Wab, Wbb" are also OFF. Therefore, respective valves 60 of internal organ part cell 2 and internal organ cell 11b are in close state, respective valves 50 of internal cells 3ca, 3da, 3cb, and 3db are in close state, and respective valves 60 of internal cells 3aa, 3ab, 3ab, and 3bb are in close state.

Next, when "S2 and S11b" are OFF (in state 2), "Saa, Sba, Sab, Sbb" are OFF, and "Wca, Wda, Wcb, and Wdb" are also OFF. Correspondingly, respective valves 50 of the internal organ part cell 2 and the internal organ cell 11b are in close state, respective valves 50 of the internal cells 3aa, 3ba, 3ab and 3bb are in close state, and respective valves 60 of the internal cells 3ca, 3da, 3cb, and 3db are in close state. Conversely, in the state 2, "W2 and W11b" are ON, "Sca, Sda, Scb and Sdb" are also ON, and "Waa, Wba, Wab, Wbb" are also ON. Therefore, respective valves 60 of the internal organ part cell 2 and the internal organ cell 11b are in open state, respective valves 50 of the internal cells 3ca, 3da, 3cb, and 3db are in open state, and respective valves 60 of the internal cells 3aa, 3ab, 3ab, and 3bb are in open state.

In this manner, state 1 and state 2 are repeated alternately. The state 1 corresponds to the inhalation state, when the internal organ part cell 2 and the internal organ cell 11b expand, and the body surface spreads outwards to the body exterior. Conversely, the state 2 corresponds to the exhalation state, when the internal organ part cell 2 and the internal organ cell 11b contract, and in response the body surface 8 shrinks inwards to the body interior. Repetition of these states 1 and 2 actualizes a respiration cycle, that is, a cycle of human respiration. Thus, it is possible to simulate motions of the internal organs and the body surface which move in response to the respiration cycle. Note that FIG. 9 is only an example of timing chart of a signal for controlling each of the valves.

Treatment Inspection

Figure 5:
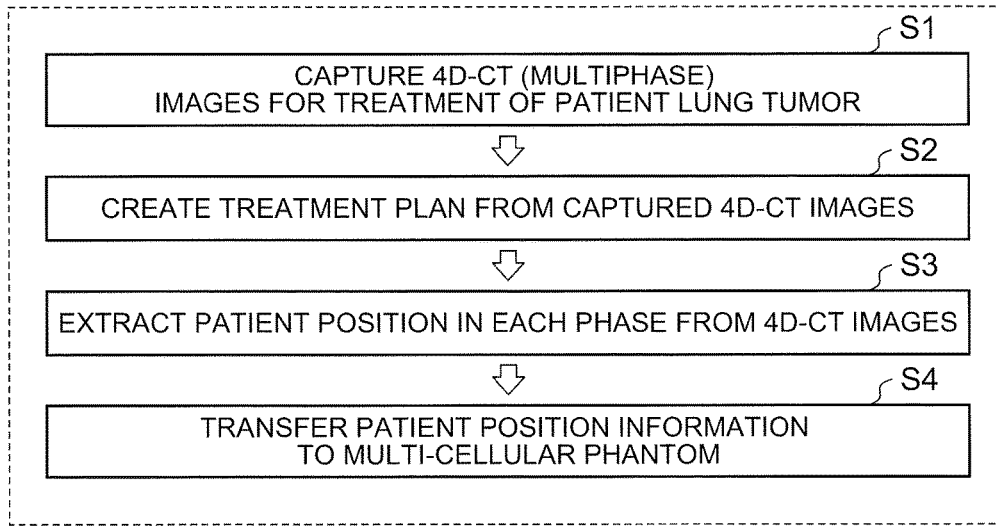
FIG. 5 is a flowchart schematically illustrating preparation and prior inspection for radiation therapy of lung tumor.
Figure 5:
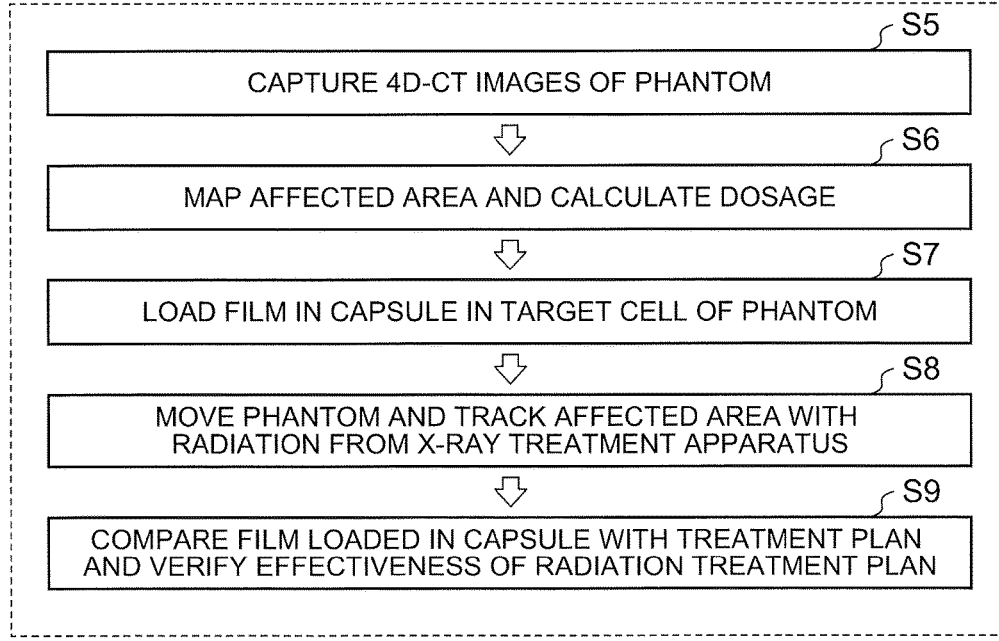

Next, referring to FIG. 5, prior inspection of radiation treatment is described by way of an example of lung malignant tumor.

First, in step S1, a patient H is placed on a couch 200 of the X-ray treatment apparatus in FIG. 1, and a set of four-dimensional CT images of the patient is captured. The result is stored in memory devices in the information processing apparatus 300. Here, "four-dimensional" means that the image data has three spatial dimensions and a time axis, in total four dimensions. Images in multiphase mode are those obtained by accumulating several phases of inhalation-exhalation repetition. By obtaining these multiphase images, it is possible to track motion of a specific point within the body, and to comprehend human motion. To track motion of a specific point in the body, a gold marker may be inserted near the affected area, and the position of the gold marker may be traced.

Next, in step S2, by referring to the 4D-CT images, a physician makes a treatment plan, setting the direction of the radiating X-ray beams, a size of radiation field, beam intensity, number of beams, etc. Next, in step S3, the patient position in each phase is extracted from the 4D-CT images, and the information is recorded in an SD card 35. Then, in step S4, the SD memory card 35 is mounted on the controller 10 of the X-ray apparatus in FIG. 2. These steps constitute a preparation process. In this preparation process, information on the affected area motion of the patient can be recorded to the SD card 35.

Next, in step S5, multi-cellular phantom F is placed on the couch 200 of the CT apparatus in FIG. 1, and the 4D-CT images of the phantom F are captured. In the next step S6, mapping of the affected area and a dose calculation are carried out. In a dose calculation, the X-ray dosage absorbed in the treated area and exposure of the surrounding internal organs and surrounding tissues are obtained. In the next step, S7, a film is loaded in a capsule built into the target cell 4. In step S8, the controller 10 of the control system illustrated in FIG. 4 is activated, and while moving the multi-cellular phantom and tracking the affected area, radiation is carried out by using the X-ray treatment apparatus described in FIG. 2. In step S9, by judging how the film mounted in the capsule in the target cell 4 which simulates the affected area is irradiated by X-rays, it is determined whether the treatment plan set up in step S2 is carried out as planned. In this manner, a prior inspection of the X-ray treatment by using the multi-cellular phantom (prior inspection) is carried out.

As described above by way of an example of a malignant tumor in lungs, a prior inspection of the X-ray treatment can be carried out with high accuracy. By this means, the accuracy in X-ray treatment improves, X-ray is radiated only onto a malignant tumor as a target, and X-ray irradiation of normal cells is minimized. Also, according to the present form of the phantom, intake of metallic element into the interior is avoided, and the effect of metals on the electromagnetic radiation is drastically reduced.

Other Internal Organs

Appropriate internal cells may be installed in the body cell 12 in FIG. 3, and therein other internal organs like the heart, liver, pancreas, kidneys, and prostate may be installed. For example, it is possible to reproduce the heart motion realistically by controlling the compressed air flow such that an outer wall of a cell expands or contracts like a balloon. And it is also possible to reproduce human body motion more realistically by providing a member simulating a bone structure in the human body. Also, it can be configured such that various types of infills are arranged in the necessary internal organ cells in the internal organ part cell 2 in order to make the electron density closer to human internal organs.

Additional modifications and variations of the present invention are possible in light of the above teachings. It is therefore to be understood that, within the scope of the appended claims, the invention may be practiced other than as specifically described herein.

LIST OF REFERENCE NUMERALS

1: phantom F
2: internal organ part cell (chest cell)
3: internal cell
4: target cell
5: dorsal surface part
6: internal organ part cell (abdomen cell)
7: shoulder part
8: body surface
9: soft epoxy
10: controller
11a, 11b: internal organ cells
12: body cell
20: compressor
30: pressure regulator group
31: pressure regulator
32: pressure regulator
35: SD card
40: tube
50: valve (for inhalation)
60: valve (for exhalation)
70: marker
100: gantry
110: X-ray generator
150: X-ray generator
160: collimator
170: protrusion
172: through-hole
200: couch
300: information processing apparatus
310: monitor
320: keyboard
330: SD card slot

What is claimed is:

1. A multi-cellular phantom for radiation oncology for simulating motions of both a surface of the human body and internal organs simultaneously, comprising:

a body cell to simulate a human body, consisting of a single chamber;

one or more internal organ part cells provided in the body cell;

and one or more internal organ cells to simulate human internal organs and provided in respective ones of the internal organ part cells, wherein each of the internal organ part cells and the internal organ cells is provided with a mounting part to connect a tubular member to pass fluid, wherein each of the body cell, the internal organ part cells, and the internal organ cells are constructed with a material with an elastic surface and allowing expansion and contraction, wherein when the fluid flows in to the internal organ part cells and the internal organ cells the expansion occurs, whereas when the fluid flows out from the internal organ part cells and the internal organ cells the contraction occurs, and wherein the surface of the body cell moves synchronously with the expansion and contraction motion of the internal organ part cells and the internal organ cells in a manner to propagate the expansion-contraction motion wherein a target cell and multiple internal cells are further provided between multiples of the internal organ cells, such that the internal cells surround the target cell which simulates a malignant tumor, and a detector for detecting radiation is built in the target cell, wherein each of the internal cells is constructed of radiation transmitting material, and is provided with a mounting part for connecting a tubular member to pass fluid, wherein when the fluid flows in to the internal cell the expansion occurs, whereas when the fluid flows out from the internal cell the contraction occurs, such that by controlling expansion and contraction of every internal cell, the target cell is able to be shifted in any arbitrary direction, in three dimensions, wherein an electron density of infills in the internal organ part cells, the internal organ cells and the internal cells is equivalent to an electron density of the corresponding human internal organs.

2. A multi-cellular phantom according to claim 1, wherein the material with an elastic surface and allowing expansion and contraction transmits electromagnetic waves.

3. The multi-cellular phantom according to claim 1, further comprising one or more markers close to the target cell.

4. The multi-cellular phantom according to claim 3, further comprising a recording media inserted in the target cell to detect an X-ray.

5. The multi-cellular phantom according to claim 1, wherein the mounting part is a hollow protrusion to fix a tube as the tubular member.

6. The multi-cellular phantom according to claim 1, wherein the mounting part is an integral molding of the cell and the tube as the tubular member.

7. The multi-cellular phantom according to claim 1, wherein the internal organ part cell is composed of at least a chest cell and an abdomen cell.

8. The multi-cellular phantom according to claim 1, wherein the internal organ cell simulates at least one among a lung and a heart.

9. The multi-cellular phantom according to claim 1, wherein the tubular member for passing through fluid to each of the cells consists of two systems for inflow and outflow.

10. A control method for controlling a multi-cellular phantom for radiation oncology for simulating motions of both a surface of the human body and internal organs simultaneously, the multi-cellular phantom comprising:

a body cell to simulate a human body, consisting of a single chamber;

one or more internal organ part cells provided in the body cell; and one or more internal organ cells to simulate human internal organs and provided in respective ones of the internal organ part cells, wherein each of the internal organ part cells and the internal organ cell is provided with a mounting part to connect a tubular member to pass fluid, wherein each of the body cell, the internal organ part cells, and the internal organ cells are constructed with a material with an elastic surface and allowing expansion and contraction, wherein when the fluid flows in to the internal organ part cells and the internal organ cells the expansion occurs, whereas when the fluid flows out from the internal organ part cells and the internal organ cells the contraction occurs, and wherein the surface of the body cell moves synchronously with the expansion and contraction motion of the internal organ part cells and the internal organ cells in a manner to propagate the expansion-contraction motion, wherein a target cell and multiple internal cells are further provided between multiples of the internal organ cells, such that the internal cells surround the target cell which simulates a malignant tumor, and a detector for detecting radiation is built in the target cell, wherein each of the internal cells is constructed of radiation transmitting material, and is provided with a mounting part for connecting a tubular member to pass fluid, wherein when the fluid flows in to the internal cell the expansion occurs, whereas when the fluid flows out from the internal cell the contraction occurs, such that by controlling expansion and contraction of every internal cell, the target cell is able to be shifted in any arbitrary direction, in three dimensions, wherein an electron density of infills in the internal organ part cells, the internal organ cells and the internal cells is equivalent to an electron density of the corresponding human internal organs, the control method comprising:

supplying compressed fluid from a compressor through a group of bidirectional tubular members that pass fluid in two directions to each cell of the multi-cellular phantom through the mounting part of each cell;

opening and closing the tubular members via multiple valves each provided at an intermediate portion of a respective one of the tubular members to control the supply of compressed fluid from the compressor to the each cell using a controller.

* * * * *